C. C. LANE.
TRANSMISSION CLUTCH CONTROL.
APPLICATION FILED MAY 8, 1916.

1,226,084.

Patented May 15, 1917.
2 SHEETS—SHEET 1.

WITNESSES:
Charles Pickles
Thos Castberg

INVENTOR
Charles C. Lane
BY Strong & Townsend
ATTORNEYS

C. C. LANE.
TRANSMISSION CLUTCH CONTROL.
APPLICATION FILED MAY 8, 1916.
1,226,084.
Patented May 15, 1917.
2 SHEETS—SHEET 2.
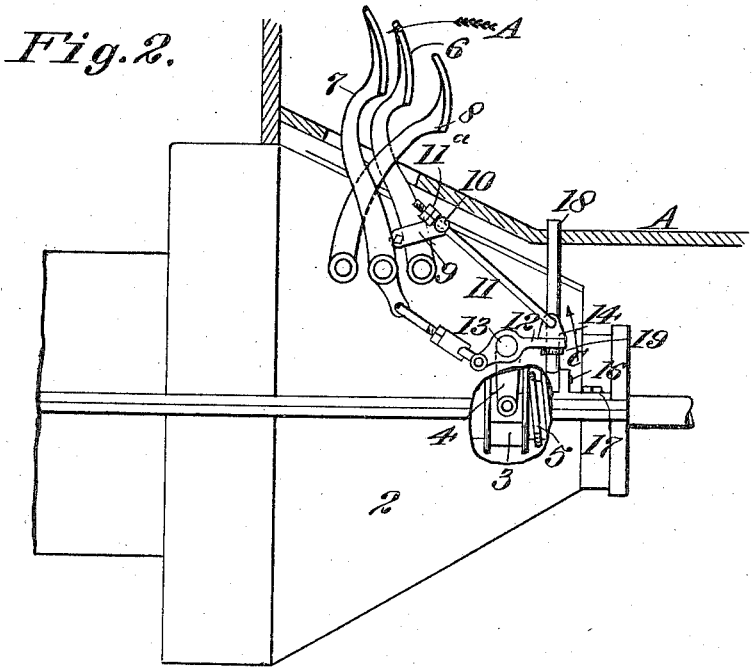
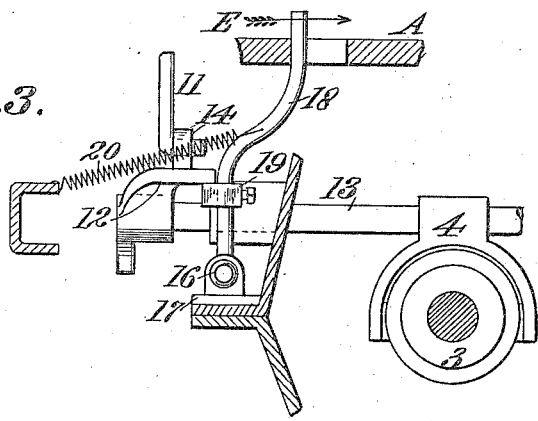
WITNESSES:
INVENTOR
Charles C. Lane
ATTORNEYS

UNITED STATES PATENT OFFICE.

CHARLES C. LANE, OF SAN FRANCISCO, CALIFORNIA.

TRANSMISSION-CLUTCH CONTROL.

1,226,084.                Specification of Letters Patent.       Patented May 15, 1917.

Application filed May 8, 1916. Serial No. 96,033.

*To all whom it may concern:*

Be it known that I, CHARLES C. LANE, a citizen of the United States, residing in the city and county of San Francisco and State of California, have invented new and useful Improvements in Transmission-Clutch Controls, of which the following is a specification.

This invention relates to a transmission clutch control.

One of the objects of the present invention is to provide means for automatically disengaging the transmission clutch on an automobile when the brake pedal is operated, and furthermore, to lock the clutch against return movement or engagement until it is manually released.

Further objects will hereinafter appear.

The invention consists of the parts and the construction and combination of parts as hereinafter more fully described and claimed, having reference to the accompanying drawings in which—

Fig. 2 is a side elevation of same, partly broken away.

Fig. 3 is an end elevation illustrating the invention with certain parts of the car shown in cross section.

Figure 1:
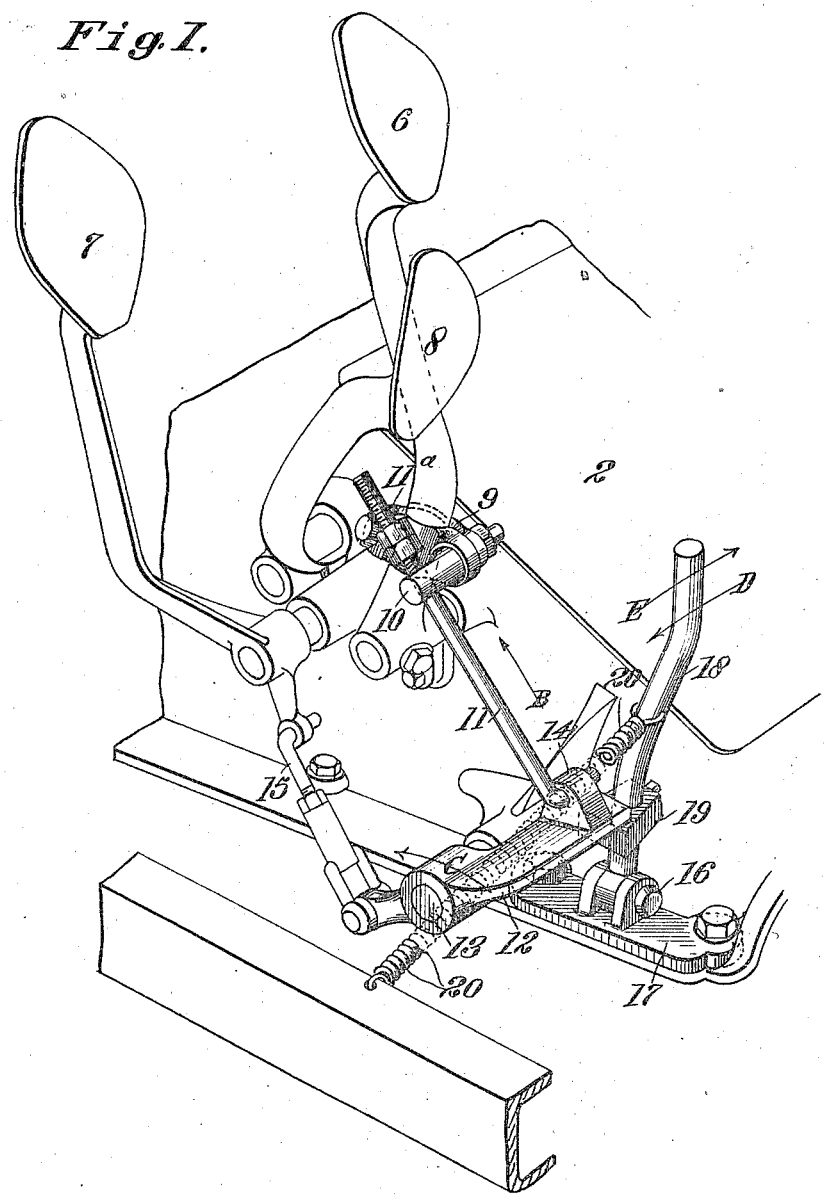
Figure 1 is a perspective view showing the application of my invention to the brake and clutch pedals of a Ford car.

It is well known that the crank shaft of an automobile engine is generally connected with the transmission gears and the rear driving shaft by means of a spring actuated transmission clutch. This clutch is necessarily disengaged whenever it is desired to change the engagement of the gears or when it is desired to stop the car or allow the engine to run without transmitting power. The purpose of the present invention is to provide means for automatically disengaging the transmission clutch whenever the engagement of the gears are to be changed, the brake applied or the car stopped and to automatically retain the clutch in the disengaged position until it is manually released.

In the present instance, the invention is illustrated and shown as applied to a Ford car in which A indicates the foot board, 2 the clutch and gear case, which in this instance is partly broken away to expose the clutch collar 3, the forked lever 4 by which it is operated and the spring 5 which normally holds the clutch in engagement; 6 shows the brake pedal, 7 the clutch pedal and 8 the reversing pedal.

Suitably secured on the arm of the brake pedal 6 is a clamp 9, on one end of which is secured a pin 10. The outer end of this pin is slotted to permit a rod 11 to project therethrough and also to permit the rod 11 to form a connection between the brake pedal and a rocker arm 12 secured upon the shaft 13, which supports the clutch fork 4. One end of the rocker arm is provided with an upwardly extending lug 14, through which one end of the rod 11 projects, while the opposite end of the rocker arm is connected with the lower end of the clutch pedal 7 by means of an adjustable link 15. Pivotally mounted as at 16 in a bracket 17 secured on one side of the clutch case at a point adjacent the rocker arm 12 is an upwardly projecting rod 18, which is sufficiently long to project through the foot board A. Secured on the rod 18 is a locking block 19 which is adapted to coöperate with the rocker arm 12 to maintain this in a certain predetermined position hereinafter to be described. The arm 18 with attached locking block 19 is adapted to swing about the pivot 16 when the rocker arm 12 is lifted in an upward direction, to permit the locking block to assume a position where it will engage the underside of the outer end of the rocker arm and lock it against return movement to normal position shown in Fig. 2. The movement of the rod 18 is lateral with relation to the rocker arm and it is moved in one direction by foot pressure and in the opposite direction by tension of the spring indicated at 20. The operation of the device will be as follows:

The position of the clutch pedal 7 and the brake pedal 6, when the transmission clutch is in engagement and the car running, is that shown in Fig. 2. If it is desired to disengage the transmission clutch for the purpose of applying the foot brake to slow down the car, it will in this instance, only be necessary to depress the brake pedal 6 or push it forward in the direction of arrow A. This causes the pin 10, mounted on the clamp 9, secured on the clutch pedal arm, to engage the adjusting nuts 11ᵃ and pull the rod in the direction of arrow B and as the rod is pivotally attached to one end of the rocker arm 12, it will be seen that this, with connected fork 4, will rock together with the shaft 13 in the direction of arrow C. The rocking movement thus transmitted to the rocker arm 12 and the clutch fork 4 will first move the transmission clutch out of engagement and will simultaneously lift the outer end of the rocker arm 12 to a point where it will disengage with the locking block 19 carried by the pivotally mounted rod 18 and permit the tension of the spring 20 to pull the rod in the direction of arrow D, or in other words, permit the locking block to assume a position where it will engage with the underside of the rocker arm and prevent it, with connected clutch fork 4 to return to the normal position shown in Fig. 2. The transmission clutch is thus locked against return movement and will remain in this locked position until the locking block 19 is removed, which can only be accomplished when the operator applies foot pressure on the rod in the direction of arrow E, to swing this about its pivot 16 against the tension of the spring 20 to a point where the block 19 will move out of engagement with the end of the rocker arm. The tension of the clutch spring 5 will then force the collar 3, with connected clutch, forward into engagement, and will, at the same time, rock the clutch fork 4 with connected rocker arm 12, back to normal position or into alinement with the locking block 19, thus preventing this from entering under the rocker arm and releasing the clutch. The attachment may be applied to any car but is in this instance shown as attached to a Ford car. A double connection between the rocker arm 12 and the brake pedal and clutch pedal is therefore shown. This double attachment is provided for the purpose of permitting the transmission clutch to be disengaged either by the clutch pedal or the brake pedal. The link 15 connecting the lower end of the clutch arm with the lower end of the rocker arm 12 forms the double connection. By referring to Fig. 2, it can easily be seen that forward movement of the clutch pedal to release the clutch through means of the collar 3 and fork 4, will transmit movement to the rocker arm 12 and cause the locking block to move into engagement as shown in Fig. 3. The rod 11 will then slide with relation to the pin 10 and assume the position shown in Fig. 1, thus permitting the brake pedal to remain inoperative when the clutch pedal is operated. The specific arrangement here shown is however, not necessary except when the device is attached to Ford cars. The double arrangement here shown is therefore of no importance except in connection with the car of the character shown. The main feature and novelty of the whole invention consists in providing means for automatically disengaging the transmission clutch through means of the brake pedal and to lock the clutch against engagement until it is manually released by the rod indicated at 18.

The device as a whole, is simple and substantial in construction. It positively and automatically moves the transmission clutch into disengaged position, either by depression of the clutch pedal or brake pedal. It will in this manner prevent dragging of the clutch disks or the low speed band when the car is coasting or when the gears are moved to reverse position, and furthermore, does away with the hand lever on the emergency brake. The car can be brought to a dead stop much quicker without jerking or without any vibration, which means greater safety and less cost and upkeep and when installed on a Ford car eliminates all guessing as to the neutral position of the clutch pedal, and furthermore, acts as a safety device to prevent the car from running over a person when cranking the car. All parts are substantially constructed and when once installed and adjusted, require no further adjustment or attention.

The materials and finish of the several parts of the invention may be such as the judgment and experience of the manufacturer may dictate.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. The combination with the transmission clutch and the brake pedal on an automobile, of means connected with the brake pedal for throwing the clutch out of engagement when the brake pedal is operated, locking means adapted to act in conjunction with or independently of said brake pedal for positively locking the clutch out of clutching condition, and means for operating said locking means independently of said brake pedal.

2. The combination with the transmission clutch and the brake pedal on an automobile, of means connected with the brake pedal for automatically throwing the clutch out of engagement when the brake pedal is operated, and means for automatically locking the clutch against return movement or engagement when the brake or clutch pedal is actuated to disengage the clutch.

3. The combination with the transmission clutch and the brake pedal on an automobile, of means connected with the brake pedal for automatically throwing the clutch out of engagement when the brake pedal is operated, means for automatically locking the clutch against return movement or engagement, and means for manually releasing said lock to permit the clutch to return and engage.

4. The combination with the transmission clutch and the brake of an automobile, of means for automatically throwing the clutch into ineffective position when the brake is actuated, means for automatically locking the clutch in ineffective position and for retaining the clutch so locked independently of said brake, and independent means to enable said clutch to return to effective position.

5. The combination with the transmission clutch and the brake and pedal therefor of an automobile, of means connected with the brake pedal for automatically throwing the clutch into ineffective position when the brake is actuated, means for automatically locking the clutch in ineffective position and for retaining the clutch so locked independently of said brake pedal, and means independent of said brake-pedal-and-clutch connecting means for disengaging said locking means to enable said clutch to return to effective position.

6. The combination with the transmission clutch, the clutch fork, the shaft upon which the clutch fork is secured and the brake pedal on an automobile, of a rocker arm secured on the fork shaft, a link connecting said rocker arm with the brake pedal to transmit movement from the pedal to rock the shaft and disconnect the clutch, and means for automatically locking the clutch against return movement.

7. The combination with the transmission clutch, the clutch fork, the shaft upon which the clutch fork is secured and the brake pedal on an automobile, of a rocker arm secured on the fork shaft, a link connecting said rocker arm with the brake pedal to transmit movement from the pedal to rock the shaft and disconnect the clutch, means for automatically locking the rocker arm when rocked to disengage the clutch against return movement, and means for manually releasing said lock.

8. The combination with the transmission clutch, the clutch fork, the shaft upon which the clutch fork is secured and the brake pedal on an automobile, of a rocker arm secured on the fork shaft, a link connecting said rocker arm with the brake pedal to transmit movement from the pedal to rock the shaft and disconnect the clutch, a rod pivotally mounted adjacent the rocker arm, a locking block secured on the rod, and a spring attached to the rod adapted to swing the rod and locking block into locking engagement with the rocker arm during certain positions of same.

9. The combination with the transmission clutch, the clutch fork, the shaft upon which the clutch fork is secured and the brake pedal on an automobile, of a rocker arm secured on the fork shaft, a link connecting said rocker arm with the clutch pedal to transmit movement from the pedal to rock the shaft and disconnect the clutch, a rod pivotally mounted adjacent the rocker arm, a locking block secured on the rod, and a spring attached to the rod adapted to swing the rod and locking block into locking engagement with the rocker arm during certain positions of same.

10. The combination with the transmission clutch on an automobile and its operating mechanism, of means for automatically locking the clutch against engagement when released, and means independent of said clutch operating mechanism for manually releasing said locking means to permit the clutch to return and engage.

In testimony whereof I have hereunto set my hand in the presence of two subscribing witnesses.

CHAS. C. LANE.

Witnesses:
 JOHN H. HERRING,
 W. W. HEALEY.